(12) United States Patent
Hagans

(10) Patent No.: US 6,599,419 B2
(45) Date of Patent: Jul. 29, 2003

(54) DEVICE FOR TREATING LIQUIDS

(76) Inventor: Friedrich Hagans, Weimarische Strasse 33, D-99099 Erfurt (DE)

( * ) Notice: Subject to any disclaimer, the term of this patent is extended or adjusted under 35 U.S.C. 154(b) by 62 days.

(21) Appl. No.: 09/918,194

(22) Filed: Jul. 30, 2001

(65) Prior Publication Data

US 2003/0019804 A1 Jan. 30, 2003

(51) Int. Cl.⁷ .............................. C02F 1/48; F02M 27/04
(52) U.S. Cl. ........................................ 210/222; 123/538
(58) Field of Search ............................ 210/222, 695, 210/223; 123/536, 538

(56) References Cited

U.S. PATENT DOCUMENTS

| | | |
|---|---|---|
| 4,872,401 A | 10/1989 | Lee |
| 4,888,113 A | 12/1989 | Holcomb |
| 5,161,512 A * | 11/1992 | Adam et al. ............... 210/222 |
| 5,411,143 A * | 5/1995 | Greene ...................... 210/222 |
| 5,453,188 A * | 9/1995 | Florescu et al. ........... 210/222 |
| 5,500,121 A | 3/1996 | Thornton et al. |
| 5,516,312 A | 5/1996 | Reed |
| 5,556,654 A | 9/1996 | Fregau |
| 5,776,461 A * | 7/1998 | Pillai et al. ................ 210/222 |
| 5,860,353 A | 1/1999 | Ceccarani |

FOREIGN PATENT DOCUMENTS

| | | |
|---|---|---|
| WO | WO 95/09816 | 4/1995 |
| WO | WO 99/55624 | 11/1999 |

OTHER PUBLICATIONS

PTO–2003–870, Translation of WO 99/55624, published on Nov./1999.*

* cited by examiner

Primary Examiner—David A. Reifsnyder
(74) Attorney, Agent, or Firm—Collard & Roe, P.C.

(57) ABSTRACT

A device for treating liquids. There are two shells made from polyurethane material wherein each shell contains a series of magnets disposed in these shells. When these shells are placed around piping, the magnets are spaced apart axially along the tubing so that there are three pairs of magnets that oppose each other. In this configuration the three pairs of magnets disposed inside the shells align either in a N—N configuration, a N-S configuration or a S—S configuration. The polyurethane material can be made semi-hard and fire resistant so that it can be applied to treat fuels in engines as well.

7 Claims, 3 Drawing Sheets

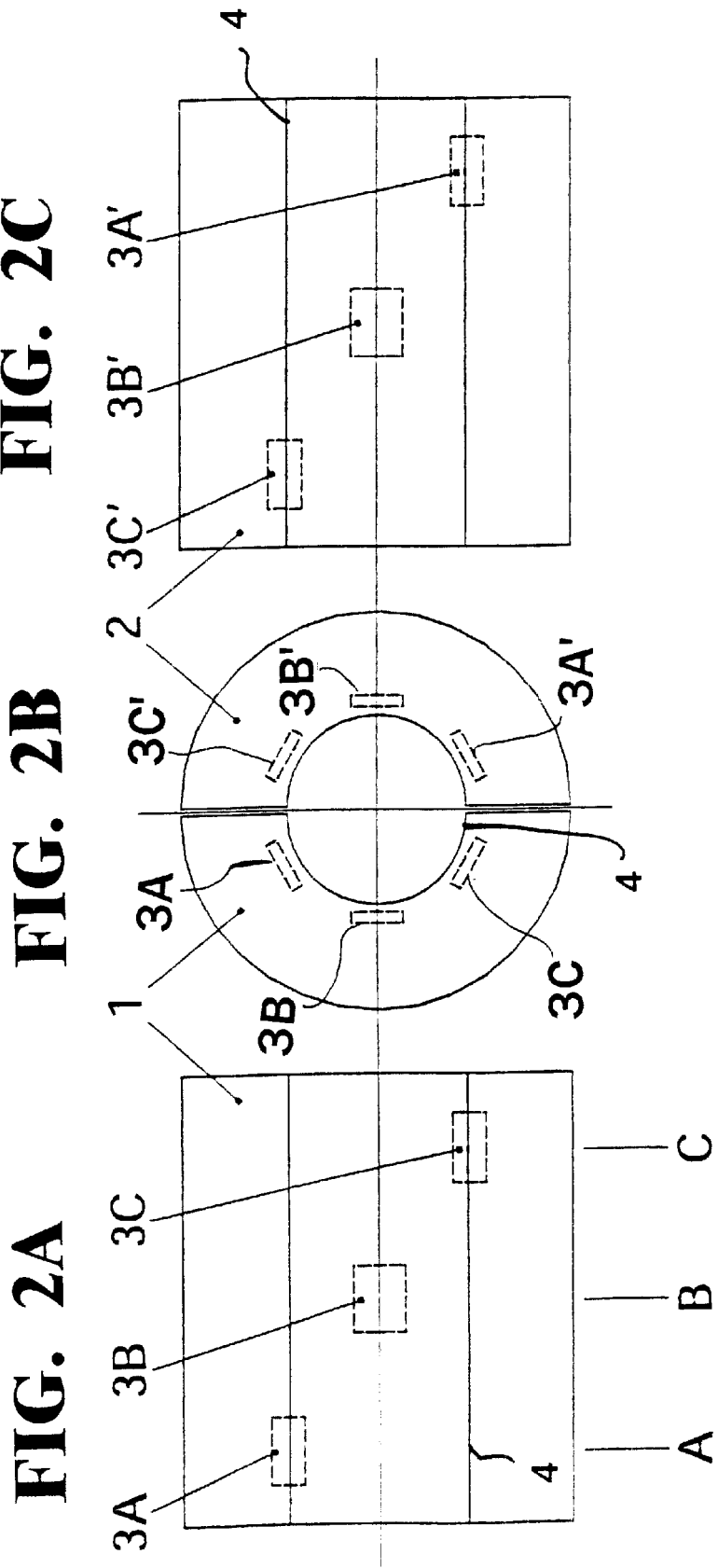

DEVICE FOR TREATING LIQUIDS

BACKGROUND OF THE INVENTION

1. Field of the Invention

The invention relates to a device for physically treating liquids in a section of tube by using permanent magnets opposing each other in pairs around a tube. These permanent magnets are disposed one after the other in the axial direction and in a helical configuration in a body made from unmagnetizable material.

If the flowing liquids move through a magnetic field which extends vertically to the direction of flow, the effect of the Lorentz power takes place, i.e. bipolar molecules are being electrostatically charged. In the case of fuel, added oxygen is better bonded thereto than to circular molecules which are predominantly present in fuel. As a result, such molecules or molecule groups are burned immediately which brings about a higher quantity of effectively burned components of the respective fuel.

2. Description of the Prior Art

A number of systems comprising permanent magnets are known in the art. For example, U.S. Pat. Nos. 4,888,113; 5,500,121; 5,556,654; 4,872,401; and 5,860,353 are known in the art and incorporated herein by reference.

These systems are for physically treating liquids such as water or fuels whereby these permanent magnets are mounted on the pipeline conducting the flow of liquid. Known devices include ring shaped or flat magnets and also multi-component systems mounted on the pipelines. These systems are created to treat the liquid to maximally influence it by a magnetic field.

Liquids have been successfully treated by magnetic fields for decades for medical purposes. There are also a number of devices that are installed directly in or on the stream of liquid. However, devices comprising a plurality of pairs of magnets that oppose each other symmetrically and are offset in a linear configuration are effective whereby the poling of all magnetically active pairs are aligned in a North—North (N—N) configuration. This type of a configuration produces very favorable results for the specific liquid being treated such as the treatment of fuels. When these arrangements or configurations are used for treating water however, the greater varieties in the water composition pose problems for the successful influence of the magnetic spectrum exerted on the water. This applies in particular if the flow rate of the streams of liquid vary.

A device for physically treating liquids using magnets is known from WO 99/55624, which discloses more than two pairs of magnets, arranged in such a way that a helical magnetic field is created in the tube section.

The drawbacks of these known systems are that they have a limited degree of efficiency, or that they are suitable only for specific liquids.

Furthermore, these permanent magnets can be arranged in different configurations in a compact manner in plastic compounds to safely secure these magnets in their installed positions.

U.S. Pat. No. 5,516,312 and WO 95/09816 describe arrangements for such a purpose which include the use of thermosetting plastics. Magnet carriers or means for holding the magnets made from plastic materials consisting of thermosetting or thermoplastics, which are produced by transfer or injection molding or casting methods are not used with this system but other systems. These systems are not used because the heat acting on these permanent magnets in the course of operation diminishes the degree of efficiency of such devices.

SUMMARY OF THE INVENTION

The invention is designed to treat fluids such as all types of liquid compositions at a favorable cost with high efficiency. Furthermore, this device should be produced at a favorable cost as well.

The magnetic field generated by the permanent magnets is preferably produced by magnetic fields acting in a homopolar manner and opposing each other in pairs. These magnetic fields extend in an axially successive arrangement with a helical configuration over the entire length of the arrangement with the same spacing between the magnets.

The screw shape of the magnetic fields extending axially to the flow direction of liquid assures the complete coverage of the tube cross section in a pipe since the stream therein as a rule runs in a laminar fashion. If the magnetic fields are exclusively linear, rim portions in the cross section of the supply line are not covered. The same holds true for magnetic polarities. The reaction of the molecules present in the non-influenced stream to exclusively one polarized direction is insufficient so that due to changing magnetic fields, other molecule layers are also seized, which would remain non-influenced without such an arrangement. Thus, this design creates a highly effective compact unit that can be built into new motor vehicles.

This arrangement generates a helical magnetic field. The individual magnets are arranged in a homopolar manner, whereby the respective north poles and the respective south poles are preferably directed in an alternating arrangement at the tube. The pairs of magnets disposed one after the other are each mounted with a linear spacing corresponding to 1.5 to 2 times their length. The pairs of magnets arranged in a helical configuration are embedded in two half shells preferably made of an elastic plastic material.

Because the compact system of the paired permanent magnets act in a homopolar manner, these produce a full-volume effect to influence the liquids being treated due to the long, turned magnetic field. This magnetic field permits a short and compact construction.

The active magnetic field is applied by different fields each being arranged one after the other in an alternating manner and homopolar in the N—N and also in the South—South (S—S) arrangement. The fields are also applied with opposite polarity in the N-S configuration, in the direction of the tube section.

To vary the effective fields of the arrangement, it is possible to cause two or more groups of this arrangement to successively act on the respective line flowed through by the treated liquid. With the basic unit and its multi-style arrangement it is possible to adapt the action of the magnetic fields which can be adjusted at any time from the outside to the given requirements, whereby the basic unit remains the same.

In an advantageous embodiment of the invention, the position of the permanent magnets for treating fuel is fixed by means of a semi-hard, flame retardant polyurethane elastomer foam material. In addition, the polyurethane elastomer can be in the form of an integral foam material. Thus, the permanent magnets are coated in fuel treatment devices by injecting the foam around the magnets in molds.

A semi-hard integral elastomeric polyurethane foam, produces a closed outer skin, and a core zone with closed cells is formed around the magnets. This foam insulates the magnets thermally against the very high temperatures prevailing on the outside in the engine compartment especially when operating in hot climatic zones. Permanent magnets are sensitive to high temperatures in excess of about 100° C. and lose power that is irreversibly lost and constantly diminishes the effect. Embedding these magnets in compact plastics such as thermosetting plastics or thermoplastics, does not offer any safe thermal protection and needs to be additionally supported. This is only inadequately achieved with the material having conditioned coefficients of thermal conductivity of such plastics of about 0.16 to 0.29 kcal/m.h. centigrade through a reinforcement of thickness of the wall. Furthermore, increasing the wall thickness of these systems to enhance the thermal protection incurs additional cost for materials and, furthermore, restricts their application due to the resulting greater volume which makes accommodating these coated systems in motor vehicles impossible.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings wherein similar reference characters denote similar elements throughout the several views:

FIG. 2A shows a side view of a first half shell with three permanent magnets;

FIG. 2B shows a front view of both half shells put together;

FIG. 2C shows a side view of a second half shell with three permanent magnets;

DETAILED DESCRIPTION OF THE PREFERRED EMBODIMENT

Figure 1:
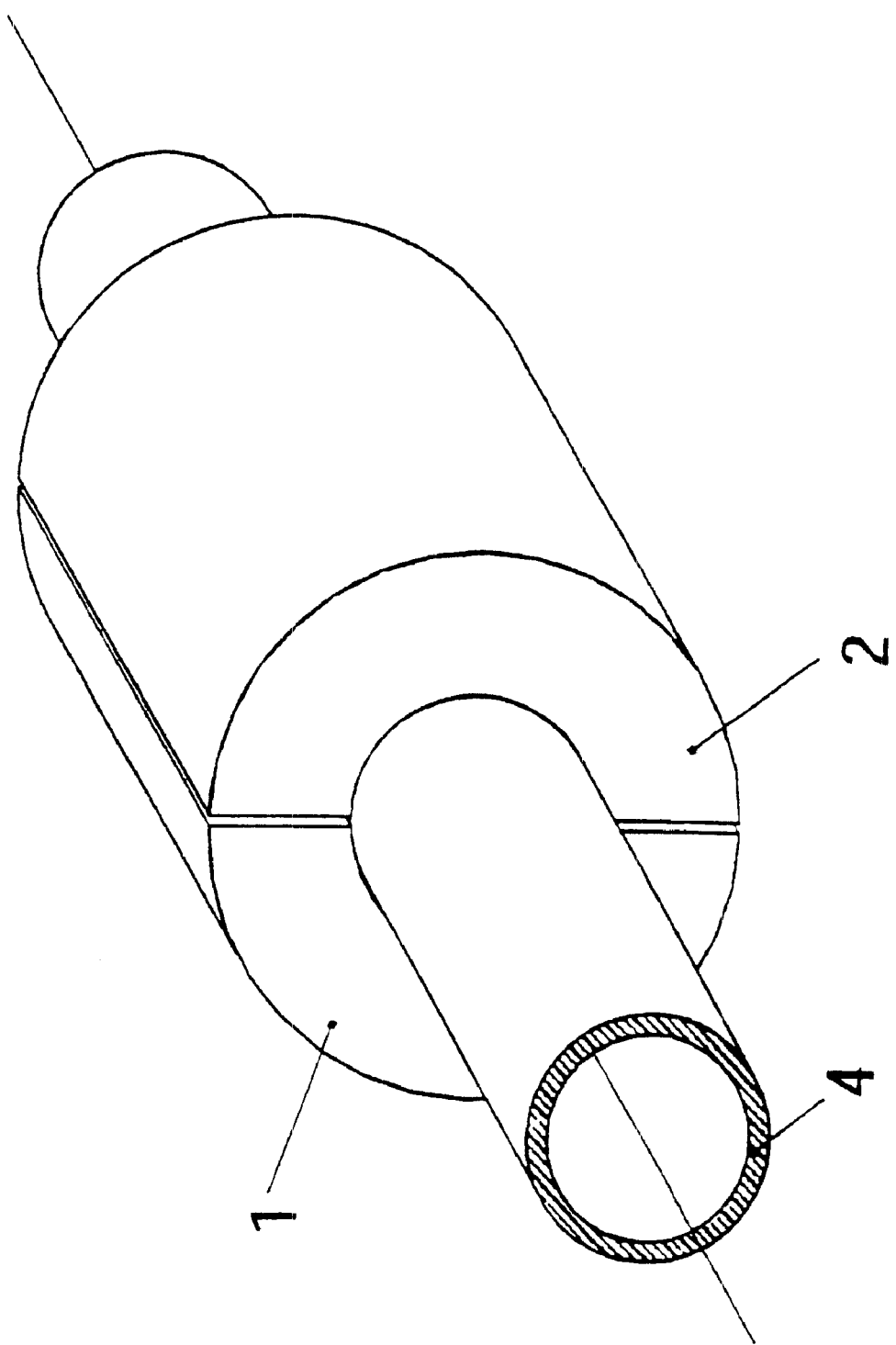
FIG. 1 is a perspective view of an arrangement in which three pairs of permanent magnets are arranged in two half shells.

Referring in detail to the drawings, FIG. 1 shows an arrangement comprising two half shells 1, and 2 in which three permanent magnet pairs 3 (See FIGS. 2A–2C) are mounted. The polarity is aligned so that with the first magnet pair, 3A–3A' the magnetic north poles are directed at the center of the arrangement. With the second pair of magnets, the north pole of one magnet and the south pole of the other magnet are directed at the center of the arrangement. With the third pair of magnets, the south poles are directed at the center of the arrangement. The magnets are arranged offset one after the other in the longitudinal direction in a helical configuration.

FIG. 2A shows a side profile of a first half shell 1 showing three sets of magnets 3A, 3B, and 3C disposed thereon. This first half shell 1 wraps around a pipe 4 and contains a series of magnets 3A, 3B, and 3C. Each of these magnets are oriented along a different radial position on the shell along different positions extending along its longitudinal axis.

As shown in FIG. 2B half shells 1 and 2 have a set of magnets wherein half shell 1 has magnets 3A, 3B, and 3C while half shell 2 has magnets 3A', 3B' and 3C' (also shown in FIG. 2C). The magnets are positioned in half shells 1 and 2 so that 3A is spaced opposite 3A' at the same axial distance while 3B is spaced opposite 3B' and 3C is spaced opposite 3C'.

Figure 3C:
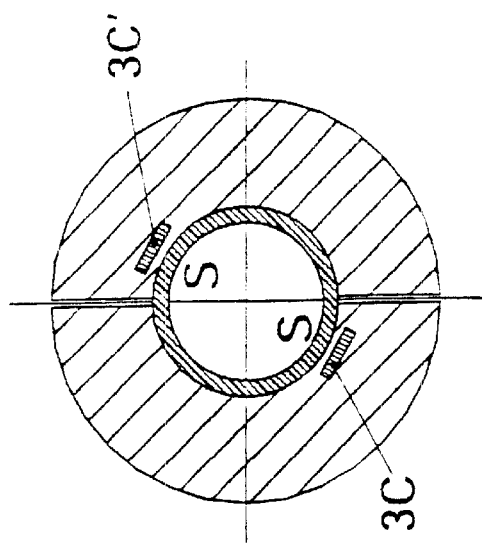
FIG. 3C shows the radial arrangement of the third pair of permanent magnets.
Figure 3B:
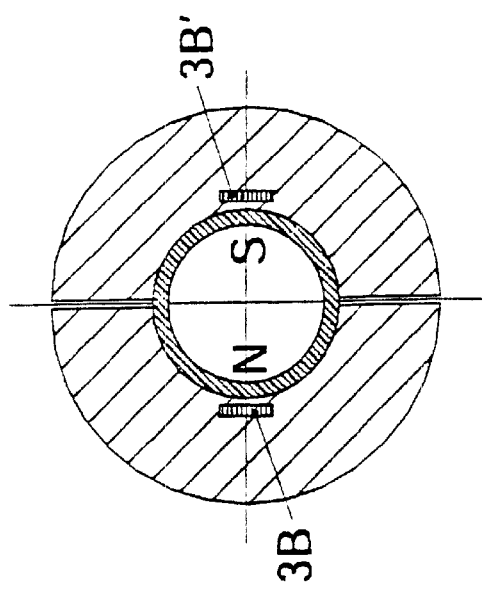
FIG. 3B shows a radial arrangement of the second pair of permanent magnets.
Figure 3A:
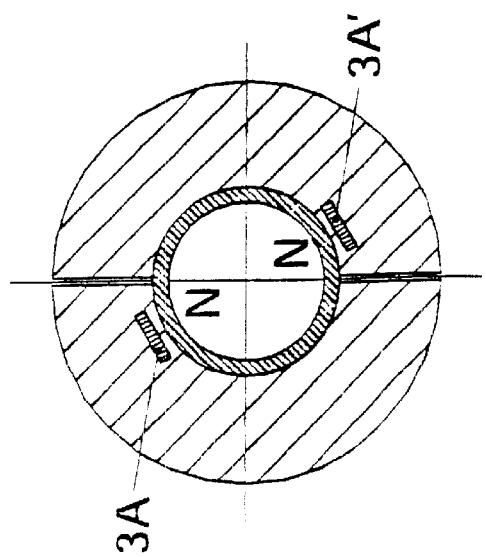
FIG. 3A shows a radial arrangement of the first pair of permanent magnets.

FIG. 3A shows the three different positions for magnets 3A, 3A' 3B, 3B', 3C, and 3C'. As shown in FIG. 3A, magnets 3A and 3A' are disposed opposite each other while magnets 3B and 3B' are disposed opposite each other and magnets 3C and 3C' are disposed opposite each other. FIGS. 3A, 3B and 3C show the different polar positions for the magnets wherein the first position with magnets 3A and 3A' as north pole magnets disposed opposite each other in a N—N configuration. FIG. 3B shows magnets 3B and 3B' disposed opposite each other in a N-S configuration while FIG. 3C shows magnets 3C and 3C' disposed opposite each other in a S—S configuration.

In a preferred embodiment of the invention, hard shells 1 and 2 are cast in semi-hard polyurethane elastomer foam. The foam is made from a flame-retardant formula as an integral foam with a 60° Shore A hardness and a coefficient of thermal conductivity of about 0.035 kcal/m.h. centigrade around the fixed permanent magnets. The material is formed around these magnets in closed molds, using known production methods. Approximately 1/10 of the values of thermal conductivity achieved until now are obtained in this way, which means that correspondingly smaller amounts of material are required for obtaining the same thermal protection, and thereby resulting in smaller structural sizes. Furthermore, the shell is made from a semi-hard flame-retardant cellular material which secures a superior change in form as compared to known elastic, compact plastics used for the same purpose of application. In addition the flame retardant adjustment of the plastic system offers increased fire protection.

Accordingly, while several embodiments of the present invention have been shown and described, it is to be understood that many changes and modifications may be made thereunto without departing from the spirit and scope of the invention as defined in the appended claims.

What is claimed is:

1. A device for treating liquids in an unmagnetizable tube comprising:
    a) at least one shell disposed around the tube and extending in an axial direction along the tube; and
    b) a plurality of permanent magnets disposed within said at least one shell wherein said permanent magnets are arranged sequentially in opposing pairs of permanent magnets along an axis of said at least one shell, said opposing pairs of permanent magnets being offset in a helical configuration wherein at least one of said opposing pairs of permanent magnets is aligned in a homopolar manner.

2. The device according to claim 1, wherein said plurality of permanent magnets comprises at least three opposing pairs of permanent magnets.

3. The device according to claim 1, comprising a pair of magnets aligned in an antipolar manner in a N-S or in a S-N arrangement between each pair of magnets aligned in a homopolar manner.

4. The device according to claim 1, wherein said permanent magnets are in the form of flat magnets.

5. The device according to claim 1, wherein said plurality of permanent magnets comprise two groups of permanent magnets installed axially one after the other on a section of said tube comprising a first group having said at least one homopolar opposing pair of permanent magnets and a second group having at least one non-homopolar opposing pair of permanent magnets.

6. The device according to claim 1, wherein said at least one shell is made from a fire retardant material.

7. The device according to claim 1, wherein said at least one shell comprises polyurethane foam.

* * * * *